Patented June 26, 1923.

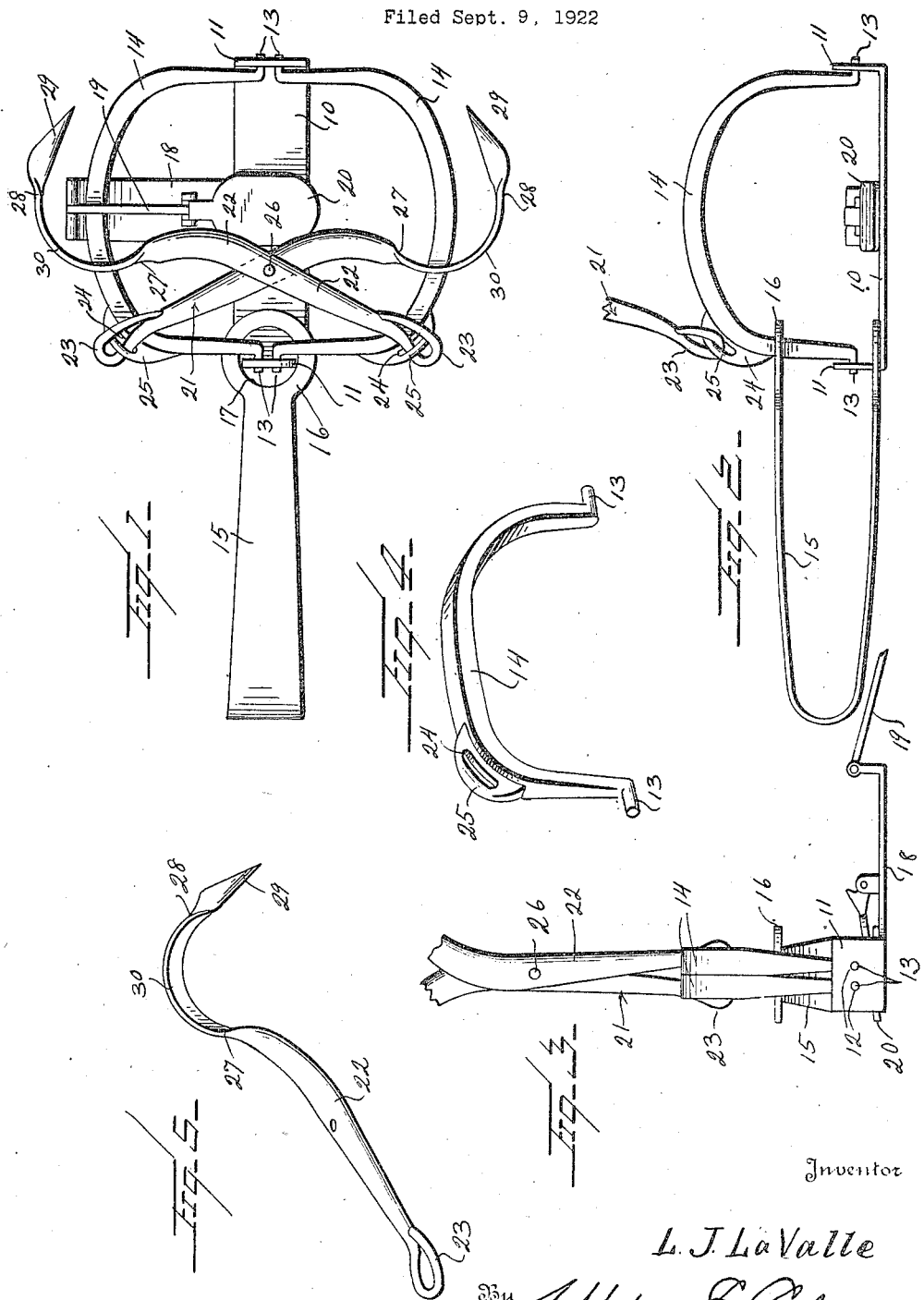

1,459,897

UNITED STATES PATENT OFFICE.

LOUIS J. LA VALLE, OF WARREN, PENNSYLVANIA.

ANIMAL TRAP.

Application filed September 9, 1922. Serial No. 587,135.

*To all whom it may concern:*

Be it known that LOUIS J. LA VALLE, a citizen of the United States, residing at Warren, in the county of Warren and State of Pennsylvania, has invented certain new and useful Improvements in Animal Traps, of which the following is a specification, reference being had to the accompanying drawings.

This invention relates to animal traps, particularly those of the spring type, and has for its object the provision of a novel trap which in addition to the usual jaws is equipped with pinchers which will automatically operate to piercingly engage the body of the animal and probably kill it so as to avoid causing unnecessary pain and suffering, the pinchers further operating to prevent any possible escape of the animal by twisting and turning or chewing off a leg caught by the jaws even though the pinchers might fail to effect killing.

An important object is the provision of a trap of this character in which the pinchers are yieldable so that in case they strike against a bone which they fail to pierce or break the jaws will still be permitted to close and exert their usual gripping action.

An additional object is the provision of a trap of this character which will be simple and inexpensive in manufacture, efficient and durable in service and a general improvement in the art.

With the above and other objects and advantages in view the invention consists in the details of construction to be hereinafter more fully described and claimed, and illustrated in the accompanying drawings in which:

Figure 1 is a plan view of the trap showing it in set position;

Figure 2 is a side elevation showing it sprung;

Figure 3 is a front elevation with the parts in sprung position;

Figure 4 is a detail perspective view of one jaw; and

Figure 5 is a detail perspective view of one of the pincher members.

Referring more particularly to the drawings, the numeral 10 designates the base which has its ends upturned to define flanges 11 formed with the holes 12 within which are journaled the upturned ends 13 of the jaws 14. The numeral 15 designates the main spring which has one end suitably secured to the base 10 and which has its other end terminating in a head 16 provided with an opening 17 through which one arm of each jaw extends in the usual manner.

Extending laterally from the base 10 is a support 18 upon which is pivoted a catch 19 cooperating with a keeper notch in a pivoted treadle 20, it being seen that when the jaws 14 are in open position and the catch 19 engaged over one jaw and within the notch of the treadle the trap will be in set position. The structure thus far described is more or less conventional.

The essential feature of the present invention is the provision of a pair of pincher members designated broadly by the numeral 21. Each pincher member is of hook shape and it is formed from a single piece of steel. The intermediate portions of the pincher members are substantially circular in cross section of a rod like formation and are indicated at 22 while the ends of the shanks are tapered and terminate in loops or eyes 23 engaged within openings 24 formed in lugs 25 preferably cast or otherwise secured to the jaws 14. It should be mentioned that these lugs are rounded between their outer edges and the adjacent edges of the openings 24 to prevent binding of the loops or eyes 23. This rounded portion is indicated by the numeral 25. The portions 22 of the pincher members are pivotally connected at 26 so that they will move freely in accordance with the movement of the jaws. Between the pivot point 26 and the hook ends of the pincher members the material is twisted partly as indicated at 27 and then retwisted at a spaced point as indicated at 28. The extreme ends are pointed at 29 so as to readily penetrate the body of an animal. Between the points of twisting 27 and 28 the material forming the pincher members is hammered or cut away so as to reduce the thickness materially in order to form leaf springs which are indicated at 30.

The set position is shown in Figure 1 and such position is maintained by the action of the catch 19 cooperating with the treadle 20. At this time the pincher members are in spread position. When an animal steps upon the treadle it will be rocked in the usual manner to release the trip or catch 19, whereupon the spring 15 will force the jaws 14 together. As this movement occurs the bringing together of the rear ends of the pincher members will cause swinging thereof upon the pivot 26 and the points 29 will be brought together and will pierce the body of the animal. If for any reason, the points 29 cannot penetrate, the spring portions 30 will yield so as not to interfere with the closing action of the jaws 14. When an animal has been pierced by the penetrating members it is probable that death will ensue shortly if not immediately but in case the animal is not killed the pinchers will still operate to prevent it from twisting loose or being able to reach the leg caught for the purpose of chewing it off as is a common occurrence in the use of traps.

From the foregoing description and a study of the drawings it will be apparent that I have thus provided a simply constructed and consequently inexpensive trap which may be easily set and which will almost infallibly hold the animal so that escape will be impossible. Owing to the simplicity of the construction and the fewness of parts it is apparent there is little to get out of order so that the device should have a long life and efficiently perform all its functions.

While I have shown and described the preferred embodiment of the invention it is to be understood that I reserve the right to make such changes in the form, construction and arrangement of parts as will not depart from the spirit of the invention or the scope of the subjoined claims.

Having thus described my invention, I claim:

1. In a trap of the character described, a pair of main jaws, spring means normally tending to close the jaws, a trip mechanism for holding the jaws open in set position, a pair of pivotally connected pincher members operatively connected with the jaws, the pincher members terminating at their active ends in penetrating points and having the portions adjacent the penetrating points reduced to form springs permitting yielding.

2. In a trap of the character described, a pair of main jaws, spring means normally tending to close the jaws, a trip mechanism for holding the jaws open in set position, a pair of pivotally connected pincher members operatively connected with the jaws, the pincher members being of hook formation with their intermediate portions formed rigid and their hook portions reduced to define springs permitting yielding.

3. In a trap of the character described, a base, a pair of jaws pivoted on the base, spring means normally tending to close the jaws, a trip mechanism for holding the jaws open in set position, said jaws being formed with lugs provided with openings, and a pair of pincher members pivotally connected intermediate their ends and terminating at one end in loops engaged through the openings in said lugs and having their forward ends pointed and reduced to define springs permitting yielding.

In testimony whereof I hereunto affix my signature.

LOUIS J. LA VALLE.